2,795,910
ROCK PICKING MACHINE
Rhey H. Howard, Verona, Mo.

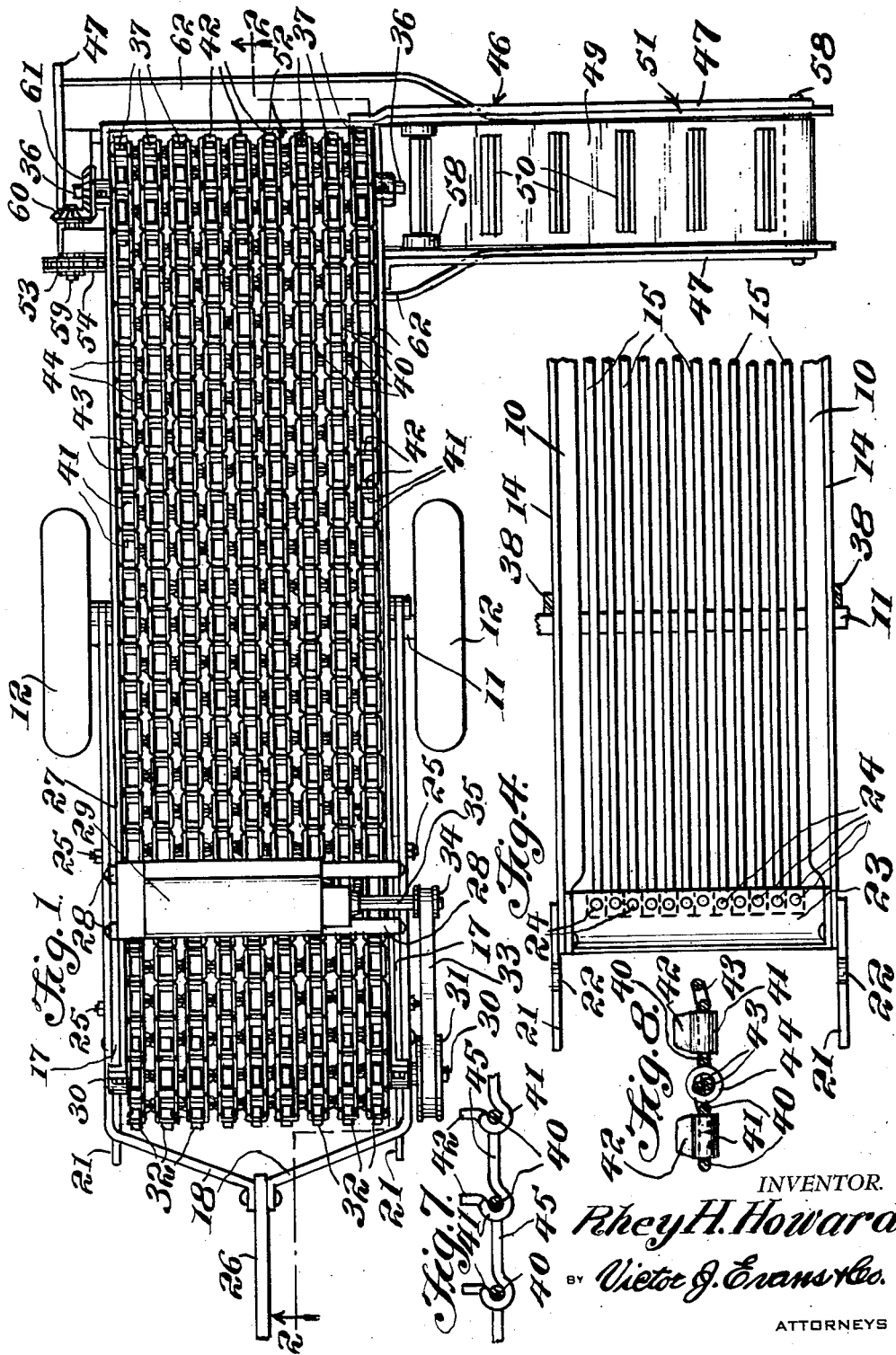

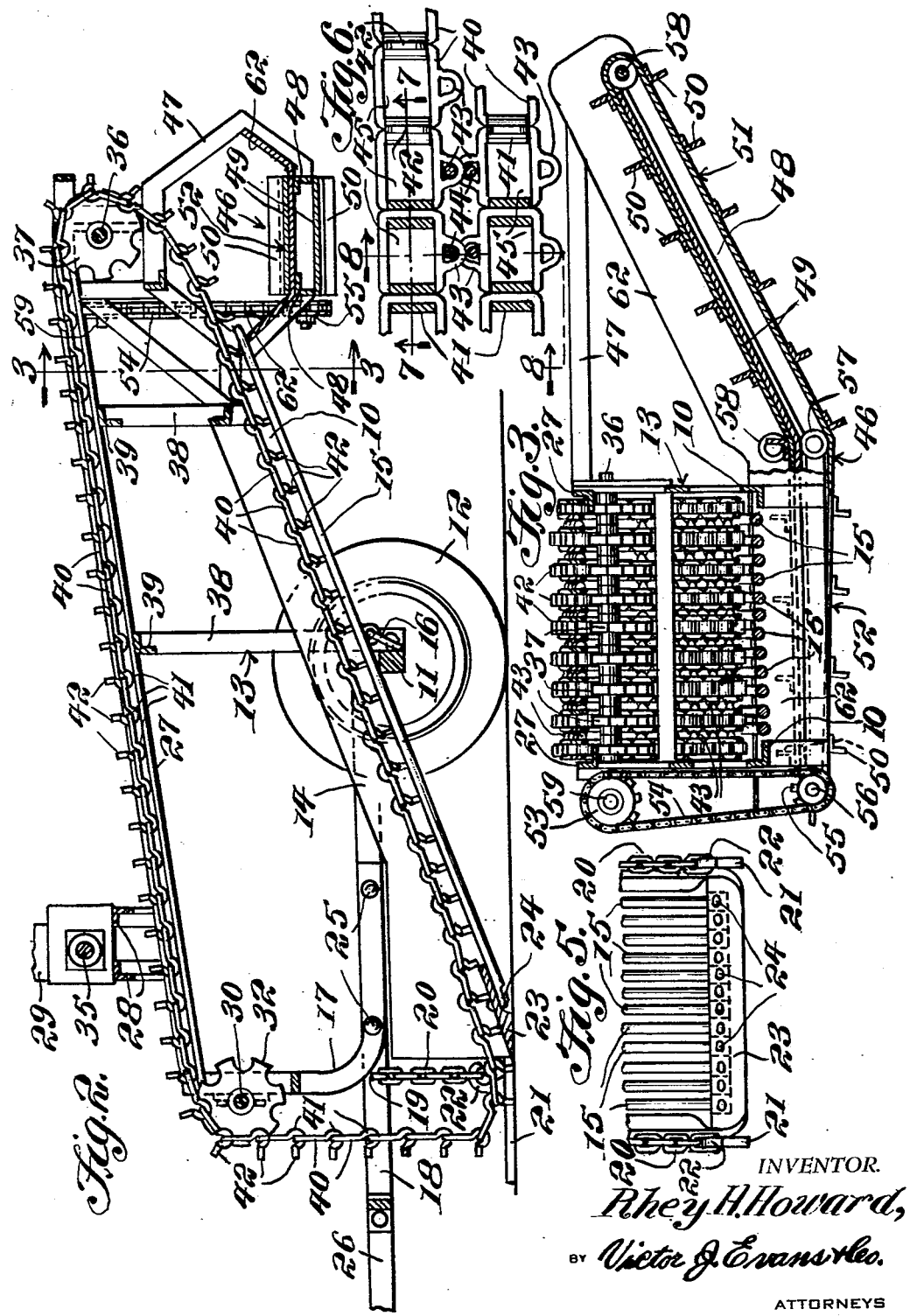

Application July 7, 1954, Serial No. 441,776

1 Claim. (Cl. 55—17)

This invention relates to a material handling machine or apparatus, and more particularly to a machine for picking up rocks from the ground.

The object of the invention is to provide a machine which will conveniently pick up rocks from the ground and carry the rocks rearwardly and upwardly so that the rocks can be deposited onto a conveyor whereby the rocks can be carried to a suitable vehicle or other desired locality.

Another object of the invention is to provide a rock picking machine which includes a frame having a plurality of endless chains mounted thereon, the chains being provided with fingers for urging the rocks upwardly and rearwardly along a plurality of spaced parallel rods whereby the smaller rocks will be able to pass down by gravity through the rods and wherein the larger undesirable rocks will be carried rearwardly so that they will be permanently removed from the ground, the machine adapted to be actuated by a suitable engine which is mounted thereon.

A further object of the invention is to provide a rock picking machine which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the rock picking machine, constructed according to the present invention.

Figure 2 is a sectional view taken on the line 2—2 of Figure 1.

Figure 3 is a sectional view taken on the line 3—3 of Figure 2.

Figure 4 is a fragmentary plan view showing the bottom rods.

Figure 5 is a fragmentary plan view of the bottom rods attached to the scoop and with the chains connected to the lugs.

Figure 6 is an enlarged fragmentary plan view showing the construction of the endless chains and fingers.

Figure 7 is a sectional view taken on the line 7—7 of Figure 6.

Figure 8 is a sectional view taken on the line 8—8 of Figure 6.

Referring in detail to the drawings, the numeral 10 designates each of a pair of spaced parallel inclined beams which form part of a mobile frame 13. Extending transversely below the beams 10 is a horizontally disposed bar 11, and a pair of wheels 12 are journaled on the ends of the bar 11. Extending between the pair of beams 10 and arranged above the bar 11 is a plurality of spaced parallel inclined bars 15. As shown in Figure 4 the bars 15 are spaced apart slightly so that small rocks and the like can pass down through these rods and be returned to the ground while the larger rocks will be conveyed upwardly and rearwardly along the spaced rods 15. A side plate 14 is supported above each of the beams 10, Figure 2, and the side plates 14 serve to insure that none of the material being conveyed upwardly along the rods 15 accidentally falls off the side thereof. The rods 15 may be pivotally connected to the bar 11 by means of a barcket assembly 16, Figure 2.

The frame 13 of the machine further includes a pair of spaced apart substantially L-shaped arms 17, and a yoke 18 may be secured to the arms 17 by means of suitable securing elements such as the rivets or bolts 25. A hitch 26 extends forwardly from the yoke 18 and is secured thereto, and the hitch 26 may be connected to a tractor or other vehicle which is used for towing the rock picking machine of the present invention along the ground as for example along a farm. The yoke 18 has a pair of suitable securing elements such as bolts 19 secured thereto adjacent the inner surface thereof, and a pair of chain members 20 each have their upper end arranged in engagement with one of the securing elements 19. The lower ends of the chain members 20 engage hook members 22 which are secured to the upper surface of lugs 21. There are a pair of the lugs 21 as shown in Figure 4, and the pair of lugs 21 project forwardly from and are secured to a scoop 23. The scoop 23 is secured to the lower front ends of the rods 15 in any suitable manner, as for example by means of rivets 24. Thus, as the machine is drawn along the ground the scoop 23 will slightly elevate or raise the rocks and help guide the rocks into the path of moving chains and these chains serve to convey the rocks upwardly and rearwardly along the rods 15 to be deposited in a conveyor as later described in this application. By raising or lowering the chains 20, the elevation of the scoop 23 and rods 15 can be varied so that the machine can be set to dig rocks at different depths or elevations.

The frame 13 further includes a pair of spaced parallel upper beams 27 which are inclined slightly so that they have their front ends lower than their rear ends, and projecting upwardly from the beams 27 and secured thereto are braces 28 which support an engine 29, and the engine 29 may be a conventional gasoline type of engine. Supported by the front of the frame is a drive shaft 30 which has a pulley 31 mounted thereon, and the drive shaft 30 also has a plurality of sprockets 32 secured thereto for a purpose to be later described. An endless belt 33 is trained over the pulley 31, and the belt 33 is also trained over a pulley 34 which is secured to the motor shaft 35 that is operated by the engine 29.

Supported by the rear of the frame 13 is a driven shaft 36 which is arranged in spaced parallel relation with respect to the drive shaft 30. A plurality of sprockets 37 are mounted on the driven shaft 36, and the frame 13 further includes vertical braces 38 and horizontal braces 39 which serve to reinforce and strengthen the parts of the frame. Trained over the sprockets 32 and 37 are a plurality of chains, and the construction of these chains is shown in detail in Figures 6, 7 and 8. Thus, there is provided a plurality of endless chains which are made up so as to include a plurality of continuous runs, and each chain section includes a plurality of similar links 40 that have an enlarged bushing 41 of substantially U-shape on an end thereof as shown in Figure 7. Extending from each of the bushings 41 is a finger 42, and the fingers 42 are arranged so that as the chains travel, the fingers 42 will engage rocks that are in the vicinity of the front of the scoop 23 to thereby carry the rocks upwardly and rearwardly along the rods 15 due to the inclination of the rods 15 as shown in Figure 2. It will be seen that for each pair of contiguous or adjacent links 40, the bushing or hook portion 41 of one link engages the adjacent portion of the next link so that an endless chain is formed since the portions 41 serve as a connecting means for the adjacent ends of the links. For connecting the chain sections together at their sides, each link 40 is provided with an apertured ear 43, and the adjacent apertured ears 43 are connected together by means of body members or connector members 44, Figure 6. Thus, all of the chains will travel or rotate in unison. The links 40 each have a substantially rectangular shape so as to provide therein an open space 45, and the teeth of the sprockets 32 and 37 project through the open spaces 45 to thereby drive the chains as the sprockets are rotated by the engine 29.

Arranged below the rear of the frame or machine is a conveyor 46 which extends transversely or at right angles with respect to the longitudinal axis of the frame 13. The conveyor 46 may be suspended below the frame by means of arms or brackets 47, and the conveyor 46 includes a pair of spaced parallel body members or beams 48 which have an endless belt 49 trained thereover. The belt 49 includes a plurality of transversely extending fingers or L-shaped bars 50 which are secured thereto so that as the endless belt 49 travels or moves, the fingers 50 will cause the rocks deposited or discharged from the rear of the rods 15 to be carried transversely away from the machine so that such rocks can be deposited in a truck, wagon or any desired locality. The conveyor 46 may include a lower horizontal section 52 which is arranged below the rear portion of the chains, and the conveyor 46 may further include an upwardly inclined section 51, as shown in Figure 3.

A means is provided for driving or operating the conveyor 46, and this means comprises a sprocket 53 that is mounted on a stub shaft 59, Figure 1. A bevel gear 60 is secured to the rear end of the stub shaft 59, and the bevel gear 60 meshes with a bevel gear 61 on the end of the driven shaft 36. Trained over the sprocket 53 is an endless chain 54, and the chain 54 is also trained over a lower smaller sprocket 55 that is mounted on a shaft 56 which extends through an end of the conveyor 46. The shaft 56 may have a roller thereon which has the endless belt 49 arranged in engagement therewith so that as the shaft 56 rotates the belt 49 will be moved, and the belt 49 may also be trained over guide rollers 57 and 58, Figure 3. Side boards 62 may be secured to the side frames of the conveyor 46 so that the rocks discharged from the chains will be guided onto the moving conveyor 46 whereby the rocks will not accidentally fall back to the ground.

From the foregoing it is apparent that there has been provided a machine which when pulled along a farm or other strip of ground will gather up stones from the ground whereby the stones can be carried rearwardly and upwardly and then conveyed laterally and deposited in a suitable vehicle or other receptacle or location. In use the machine may be attached to a tractor or the like by means of the hitch 26 and the ground engaging wheels 12 support the machine as it moves along. The engine 29 actuates the endless chains due to the provision of the endless belt 33 and the sprockets 32 and 37 which mesh with the chains. It will be seen from Figure 2 that the front portion of the chains hangs down vertically by gravity and as the chains are rotated in a counterclockwise direction by the engine 29, the projecting fingers 42 will urge or push the rocks or stones onto the scoop 23 and these rocks will then be carried upwardly along the inclined rods 15 to the rear of the machine whereby the rocks will then be deposited onto the conveyor 46. Any small particles of dirt or the like will pass back to the ground through the spaces between the rods 15. The conveyor 46 is actuated by the intermeshing gears 60 and 61 so that the endless belt 49 travels continuously whereby the members 50 carry the rocks deposited thereon first from the lower section 52 then to the inclined section 51 and the rocks will drop off the upper end of the section 51 into any desired receptacle. The angular position of the scoop 23 and the rods 15 can be adjusted by taking up or slackening on the chains 20.

With the present invention the stones or rocks can be picked up from a field and deposited in a suitable vehicle or receptacle so that the rocks can be carried to a remote locality. The scoop 23 slides on the ground due to its own weight and the scoop can be raised by hand by means of the chains 20. The chain carpet hangs straight to the ground adjacent the front end of the machine by having the front portion of the chain carpet hanging down vertically as shown in Figure 2 the slack in the chains will permit the chains to touch the ground and create the rolling action whereby the moving fingers 42 will carry the rocks upwardly along the rods 15. The chains travel in a counterclockwise direction as viewed in Figure 2. The fact that the engine 28 is mounted on the top of the machine causes the tight part of the chain carpet to be on top of the machine to thereby leave all slack to be on the bottom and this is important since this slack permits the carpet to have a two-way stretch and this in turn enables the carpet to not only roll the large rocks but also to drop down between the large rocks and roll the small ones as well and only a loose flexible dragging action will accomplish this. Also, no trash or the like will hang up on the scoop 23 and the machine is ruggedly built so that it will not accidentally break or wear out.

I claim:

In a rock picking machine, a frame embodying a pair of spaced parallel inclined beams, a horizontally disposed bar positioned transversely below said beams, a pair of ground engaging wheels journaled on the ends of said bar, a plurality of inclined spaced parallel rods supported above said bar, said rods being spaced slightly apart so that small rocks and the like can pass therethrough, a bracket assembly pivotally connecting said rods to said bar, a vertically disposed plate supported above each of said beams, a scoop secured to the lower front ends of said rods, a substantially L-shaped arm arranged on each side of the frame, a motor supported above the top of said frame, a drive shaft rotatably supported by the upper front portion of said arms, belt and pulley means connecting said motor to said drive shaft, a driven shaft supported by the rear of said frame, sprockets mounted on the ends of said drive and driven shaft, a plurality of sprockets on said drive and driven shaft and interposed between the sprockets on the ends of said shafts, a plurality of endless chains trained over said sprockets, each of said chains including a plurality of similar links, an enlarged bushing of substantially U-shape on said links, said bushings serving to connect adjacent links together, fingers projecting outwardly from said bushings, apertured ears on a side of each of said links, body members connecting adjacent ears together, said links each being substantially rectangular in shape to provide open spaces for receiving said sprockets, a pair of spaced parallel lugs extending forwardly from said scoop and secured thereto, a hook secured to the upper surface of each of said lugs, a yoke secured to said arms, securing elements secured to said yoke adjacent the inner surface thereof, a hitch member extending forwardly from said yoke, vertically disposed chain members extending between the securing elements on said yoke and said lugs and secured thereto, the lower runs of said chains being inclined and wherein the front portions of the chains hang down vertically by gravity so that the slack in the chains will permit the chains and fingers to have a rolling action as they move.

References Cited in the file of this patent

UNITED STATES PATENTS

| | | |
|---|---|---|
| 1,085,162 | Rose | Jan. 27, 1914 |
| 1,251,425 | Rogers et al. | Dec. 25, 1917 |
| 1,722,932 | Mandel | July 30, 1929 |
| 2,515,966 | Polisena | July 18, 1950 |
| 2,569,719 | Huhne | Oct. 2, 1951 |
| 2,699,031 | MacDonald | Jan. 11, 1955 |